Aug. 8, 1933.                L. D. KIPE                1,921,084
                      STERILIZATION OF RADON SEEDS
                          Filed April 30, 1930
Fig. 1.
Fig. 2.                            Fig. 3.
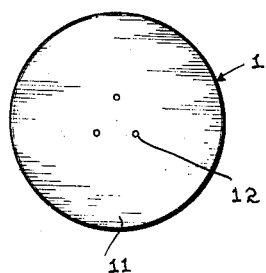          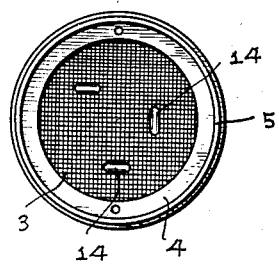
Fig. 4.
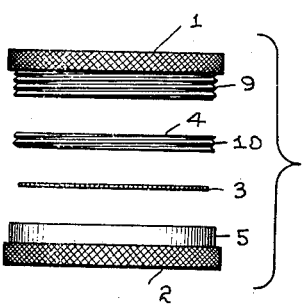
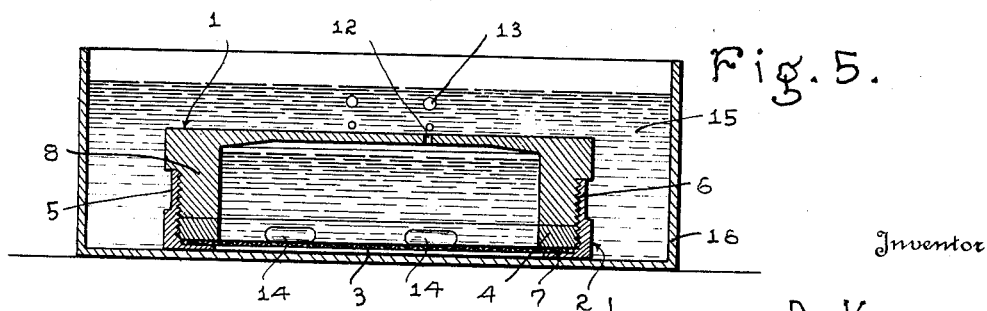
Fig. 5.
Inventor
LORENZO D. KIPE.
By Ivan P. Tashof.
Attorney

UNITED STATES PATENT OFFICE 1,921,084

STERILIZATION OF RADON SEEDS

Lorenzo D. Kipe, New York, N. Y., assignor to The Radium Emanation Corporation, New York, N. Y., a Corporation of Delaware Application April 30, 1930. Serial No. 448,666

6 Claims. (Cl. 250—34)

The present invention relates to sterilizers which are particularly suitable for the sterilization of seeds containing radium emanation.

Seeds or capillary tubes containing radium emanation are buried or implanted in human tissue in order to subject the latter to the beneficial effects of the emanation rays. The seeds prior to their introduction in the tissue must be sterilized.

Prior to the present invention, it has been customary to sterilize the seeds in a sterilizer of the type shown in U. S. Patent No. 1,576,535. However, the sterilizer therein shown, while satisfactory in many respects, has several disadvantages. In the first place, when utilizing the sterilizer, it is necessary to remove the cover before placing the sterilizer in hot water. Further, the sterilizer described in the above mentioned patent is provided with several small openings in the bottom member to permit water to enter the sterilizer and to facilitate the drainage of the sterilizer when it is taken from the sterilizing medium. The air entering through the small openings in the bottom emerges through the screen in the upper portion of the sterilizer. When the sterilizer is placed in large volumes of hot water, sometimes air pockets are formed which interfere with the satisfactory functioning of the sterilizer. In the sterilizer which is the subject matter of the present invention, instead of having the screen upon the top of the bottom member, it is positioned at the lowermost portion of the bottom member, thus eliminating the necessity for removing the cap when the sterilizer is placed in the sterilizing medium. This is of considerable importance, as it is desirous that the emanation seeds be sterilized with the cap in place in order to allow the cap to function to absorb some of the rays emanating from the radium emanation and thereby prevent the operator from being subjected to the emanation rays. In the present sterilizer, there is no possibility of air pockets being formed, as the water enters through a screen having many points of entry and not through several small openings as in the old type of sterilizer. In the latter, the bottom is provided with small openings to permit the entry of air and to facilitate drainage. In the present sterilizer, the openings are positioned in the top member, their function being to allow the elimination of air.

The weak part of any sterilizer is the screen. In the old type of sterilizer, the metal screen was permanently attached to a holding member seating on the upper portion of the bottom member. In the present sterilizer, the screen, if it becomes damaged, can be easily removed and a new screen inserted without machine work or soldering of any character.

In the utilization of emanation seeds for implantation in human tissue, it is necessary to work very quickly in order to subject the operator to as small a dosage of rays as is possible and, therefore, it is of the utmost importance that the sterilization be accomplished quickly and conveniently. The present sterilizer admirably accomplishes the above. It is not necessary to screw any portion of the sterilizer to sterilize the seeds. The sterilizer is merely dropped in hot water and the air is displaced by the hot water, the former escaping through the screw cap openings in the sterilizer.

The object of the present invention is the provision of a sterilizer which is simple in construction, comparatively inexpensive to manufacture, and in which the above referred to disadvantages are eliminated.

The present invention contemplates certain novel details of combination, construction and arrangement of parts of the improved sterilizer as will be more fully described hereinafter and pointed out in the claims, it being understood that the invention is susceptible of various changes in construction which may be made within the scope of the claims without departing from the spirit of the invention.

The invention will be disclosed and fully explained by reference to the accompanying drawing wherein:

Figure 1 is a side view of the sterilizer;

Fig. 2 is a plan view of the sterilizer cover;

Fig. 3 is a plan view of the sterilizer bottom member showing the removable sterilizer screen with emanation seeds positioned thereon;

Fig. 4 is a composite side view showing the elements of the sterilizer disassembled; and Fig. 5 is a transverse cross sectional view of the sterilizer and the seeds to be sterilized positioned in the sterilizing medium.

Referring to the drawing, there is provided a sterilizer cover 1 and a bottom member 2. A foraminous removable member or screen 3 is mounted within the bottom member and held in place by a holding rim or locking member 4. The bottom member 2 is provided with a circumferential vertical rim 5 internally threaded at 6, and a horizontal circumferential flange 7 functioning as a seat for the foraminous member or screen 3. The top member or cover 1 has a circumferential wall 8 externally threaded at 9, the latter being adapted to engage the threads 6 of the circumferential vertical rim 5 of the bottom member 2.

The foraminous member or screen 3 is held in place by the holding rim 4 seating on the circumferential flange 7, the holding rim being externally threaded at 10, whereby it is adapted to engage the threads 6 of the circumferential rim 5. In the top wall 11 of the cover 1 there are openings 12 to provide for the escape of air 13 normally present in the sterilizer.

Assuming that the bottom member 2 has had the screen 3 fixed securely in place, emanation seeds 14 are placed on the screen and the cover member 1 is threaded on to the bottom member until the two members are in tight engagement. Thereafter, the sterilizer is placed in the sterilizing medium 15 present in the container 16. As soon as the sterilizer is placed in the sterilizing medium 15, which is usually hot water, the latter passes through the screen 3, over the seeds 14, pushing air ahead of it; the latter emerging through the openings 12.

Having thus described the invention, what is claimed as new is:

1. A flat, compact container and sterilizer for holding and treating radium emanation seeds comprising in combination a bottom member having a circular horizontal flange for seating a screen thereon and a circumferential vertical rim internally threaded and extending for a short distance above the horizontal flange, a removable screen seated on said horizontal flange, a locking annulus having approximately the width of the horizontal flange whereby the screen is substantially unobstructed so as to permit the sterilization medium to pass therethrough, external threads on said locking member engaging the internal threads of the rim to thereby tightly hold the screen in position, and a cover member provided with a top wall capable of partially absorbing the rays emanating from the seeds and having a circumferential wall externally threaded to engage the internal threads of the rim of the bottom member, the lowermost face of the circumferential wall lying flush with the uppermost face of the locking annulus when the sterilizer is closed, and openings in the top wall of the cover member to permit the escape of air from the sterilizer.

2. A sterilizer for treating radium emanation seeds comprising in combination a bottom member having at its lowermost portion a horizontal flange for receiving a screen, a screen removably mounted on said flange to facilitate replacement, removable means in contact with said screen for holding the latter in place and against said flange, and a cover tightly held in engagement with the bottom member and provided with a solid top wall capable of partially absorbing the rays emanating from the seeds, said top wall having openings to facilitate the escape of air from the sterilizer.

3. A sterilizer for treating radium emanation seeds comprising in combination a bottom member having at its lowermost portion a horizontal flange for seating a screen, a screen removably mounted on said flange to facilitate replacement, a removable locking member in contact with said screen for holding the latter in place and against said flange, and a cover tightly held in engagement with the bottom member, said cover being provided with a solid top wall capable of partially absorbing the rays emanating from the seeds, and having openings to facilitate the escape of air from the sterilizer.

4. A sterilizer for treating radium emanation seeds comprising in combination a bottom member having at its lowermost portion a horizontal flange for seating a screen thereon and a circumferential vertical rim projecting from the outermost edge of said flange, a removable screen seating on said flange and adjacent said circumferential rim, a locking member removably engaging said rim and tightly holding the screen in position, and a cover member having a circumferential wall tightly engaging the circumferential rim of the bottom member, said cover member having a top wall capable of partially absorbing the rays emanating from the seeds and having openings to facilitate the escape of air from the sterilizer.

5. A sterilizer for treating radium emanation seeds comprising in combination a bottom member having a horizontal flange for seating a screen thereon and a circumferential vertical rim internally threaded, a removable screen seating on said flange, a locking member externally threaded and adapted to engage the interior threads of said rim and tightly hold the screen in position, and a cover member having a circumferential wall externally threaded for engaging the interior threads of the bottom member, and provided with a top wall capable of partially absorbing the rays emanating from the seeds, said top wall having openings therein functioning to permit the escape of air from the sterilizer.

6. A sterilizer for treating radium emanation seeds comprising in combination a bottom member provided with means for seating a screen thereon and a circumferential rim projecting therefrom having means for receiving a locking member, a removable screen seated on said seat receiving means, a locking member cooperating with the lock receiving means of said circumferential rim to tightly hold the screen in position, and a cover member having a circumferential wall locking with the circumferential rim projecting from the bottom member, and provided with a top wall capable of partially absorbing the rays emanating from the seeds, said top wall having openings therein functioning to permit the escape of air from the sterilizer.

LORENZO D. KIPE.